(12) United States Patent
Brothers et al.

(10) Patent No.: US 11,336,205 B1
(45) Date of Patent: May 17, 2022

(54) INVERTER FOR A LOW FREQUENCY AMPLIFIER WITH HIGH DRIVE VOLTAGE, HIGH POWER DENSITY, HIGH EFFICIENCY, AND WIDE BANDWIDTH OPERATION

(71) Applicant: Mainstream Engineering Corporation, Rockledge, FL (US)

(72) Inventors: John Alex Brothers, Cocoa Beach, FL (US); Christopher John Recio, Rockledge, FL (US); John Michael Van Treeck, Rockledge, FL (US)

(73) Assignee: Mainstream Engineering Corporation, Rockledge, FL (US)

( * ) Notice: Subject to any disclaimer, the term of this patent is extended or adjusted under 35 U.S.C. 154(b) by 0 days.

(21) Appl. No.: 17/242,598

(22) Filed: Apr. 28, 2021

(51) Int. Cl.
*H02M 7/5387* (2007.01)
*H02M 1/12* (2006.01)
*H02M 1/44* (2007.01)

(52) U.S. Cl.
CPC ......... *H02M 7/53871* (2013.01); *H02M 1/12* (2013.01); *H02M 1/44* (2013.01)

(58) Field of Classification Search
CPC .. H02M 7/5387; H02M 7/53871; H02M 1/12; H02M 1/126; H02M 1/44
See application file for complete search history.

(56) References Cited

U.S. PATENT DOCUMENTS

| 10,191,531 B2 * | 1/2019 | Zhang | H02M 7/483 |
| 2015/0016169 A1 * | 1/2015 | Honea | H02M 7/483 363/132 |
| 2015/0311822 A1 * | 10/2015 | Ma | H02M 7/483 363/132 |

FOREIGN PATENT DOCUMENTS

| DE | 102020201810 A1 * | 8/2021 |
| WO | WO-2021016382 A1 * | 1/2021 |

* cited by examiner

*Primary Examiner* — Adolf D Berhane
(74) *Attorney, Agent, or Firm* — Michael W. O'Neill, Esq.

(57) ABSTRACT

A low frequency direct drive amplifier is disclosed which can simultaneously achieve high drive voltages, high power density, high efficiency, and wide bandwidth operation is disclosed. The power circuit structure includes an input DC-DC converter and an output multi-level DC-AC inverter. The input DC-DC converter's circuit topology is commonly referred to as the phase shifted full bridge, which includes input capacitors, a Gallium Nitride (GaN) based full bridge, an isolation transformer, two rectifying diodes, and two series stacked output capacitors. The output DC-AC inverter includes two series stacked input capacitors (same as the input DC-DC converter's output capacitors), four Silicon Carbide (SiC) semiconductors, four Silicon IGBTs, and an output filter. The disclosure's features the combination of the output multi-level DC-AC inverter circuit topology paired with 1.7 kV SiC semiconductors, allowing for a high voltage direct drive design without a low frequency boost transformer.

5 Claims, 7 Drawing Sheets

INVERTER FOR A LOW FREQUENCY AMPLIFIER WITH HIGH DRIVE VOLTAGE, HIGH POWER DENSITY, HIGH EFFICIENCY, AND WIDE BANDWIDTH OPERATION

BACKGROUND

Sonobuoys may use hydrophones, sonar transducers, and/or a radio transmitter to transmit underwater sounds. There are three types of sonobuoys: passive, active, and special purpose buoys. Passive sonobuoys use hydrophones to listen for sound energy from a target. Active sonobuoys use sonar transducers to emit an acoustic signal and then listen using hydrophones for the return echo off an object under the water to decipher where underwater objects are located. Special purpose buoys provide utilize a radio transmitter to transmit underwater sounds and additional information about the environment in which that the buoy is located, for example, wave height or water temperature. Aircraft or ships drop sonobuoys into the water. Once in the water, the sonobuoy deploys an inflatable surface float with a radio transmitter to communicate with either an aircraft or ship and the hydrophones and sonar transducers descend below the water to a selected depth.

The present disclosure is implemented on active sonobuoys, and one implementation implements a low frequency active sonobuoy that produces acoustics in the 600 Hz to 1100 Hz frequency range. It should be appreciated, however, that other applications of the disclosure herein are contemplated.

Some implementations of sonobuoys utilize a low frequency amplifier circuit. Some low frequency amplifier circuits have been designed with circuit topologies that utilize a low voltage inverter circuit which powers a low frequency boost transformer to achieve the desired high drive voltage to power the sonar transducer load. This design approach, however, limits the amplifier's ability to simultaneously achieve a high drive voltage, high power density, high efficiency, and wide bandwidth operation (at the low frequencies of interest). Due to the low frequency operation, the low frequency boost transformer can be small but inefficient (creating thermal problems and reduced operation time due to finite battery capacity) or large and efficient (at the detriment of available space for other components). Furthermore, the low frequency transformer is inefficient when operating at the extremes of the 600 Hz to 1100 Hz frequency band, further limiting operation capabilities.

For the foregoing reasons, there is a need for a low frequency sonobuoy amplifier that can simultaneously achieve a high drive voltage (e.g., ≥1100 Vrms), high power density/low volume (e.g., ≤35 in$^3$), high efficiency (e.g., ≥85%), and wide bandwidth capability (e.g., 600 Hz to 1100 Hz). The high power density provides space for additional components such as sonar transducers, hydrophones, battery capacity, or other various electronics. The high efficiency allows for improved operation time due to finite battery capacity. The high drive voltage and wide bandwidth operation allows for more complex location tracking methods to be used such as simultaneous searches in multiple sub-bands.

SUMMARY

The present disclosure is directed to a low frequency amplifier designed for a low frequency sonobuoy application that provides both a deployable acoustical signal source and reception of underwater signals of interest. In particular, the present disclosure is concerned with a low frequency sonobuoy amplifier design that can simultaneously achieve a high drive voltage, high power density, high efficiency, and wide bandwidth capability.

In some implementations, disclosure herein is directed to a low frequency direct drive sonobuoy amplifier with high drive voltage capability (≥1100 Vrms), high power density/low volume (≤35 in$^3$), high efficiency (≥85%), and wide bandwidth (600 Hz to 1100 Hz) operation capability. The disclosure improves upon the known variations of low frequency amplifiers by simultaneously achieving these design specifications, whereas existing designs cannot. The disclosure uses a 2-stage design with an input DC-DC converter to boost the input battery voltage to a high voltage multi-level DC bus and an output multi-level DC-AC inverter converts the multi-level DC bus voltage to a controllable output waveform to power a sonar transducer or other desired load.

The output DC-AC inverter's multi-level circuit topology paired with recently commercially available 1.7 kV silicon carbide (SiC) semiconductors is one of the disclosure's central features, thereby enabling the ability to simultaneously achieve a high drive voltage, high power density/low volume, high efficiency, and wide bandwidth operation. Such topology can provide the high drive voltage without requiring a low frequency boost transformer, which is the primary cause for existing designs' inability to simultaneously achieve all of the above specifications. Furthermore, the multi-level topology is made practical due to the availability of 1.7 kV rated SiC semiconductors. Comparatively, use of silicon (Si) based semiconductors with similar voltage ratings in the same topology would experience excessive reverse recovery losses, creating thermal issues and low operation efficiencies.

The output DC-AC inverter's multi-level circuit topology operates off of a multi-level high voltage (e.g., 2 kV, referred to as $V_{bus}$) DC bus consisting of series stacked capacitors. The present disclosure has a two-level high voltage DC bus, meaning there are two series stacked DC bus capacitors (however, it should be appreciated that the disclosure is not limited to two levels). Each series stacked capacitor has a half bridge circuit in parallel to it consisting of two 1.7 kV SiC semiconductors, for a total of four SiC semiconductors for the two-level design. These half bridge circuits are modulated using control circuitry to create a modulated unipolar voltage waveform with voltages stepping between 0 V, ½ $V_{bus}$, and $V_{bus}$ for the two-level design (higher level designs will increase the number of voltage steps, for example, a 4-level design's modulated unipolar voltage waveform would step between 0 V, ¼ $V_{bus}$, ½ $V_{bus}$, ¾ $V_{bus}$, and $V_{bus}$). This modulated unipolar voltage waveform is fed to a high voltage full bridge consisting of four high voltage (e.g., ≥2.4 kV) rated insulated-gate bipolar transistors (IGBTs). This full bridge is modulated at the desired output frequency (e.g., 600 Hz to 1100 Hz) to convert the modulated unipolar voltage waveform into a modulated bipolar voltage waveform consisting of step voltages between $-V_{bus}$, $-½ V_{bus}$, 0 V, ½ $V_{bus}$, and $V_{bus}$ for the two-level design. This modulated bipolar voltage waveform is fed through an output filter to remove the switching frequency content and provide a low total harmonic distortion (THD), low frequency (e.g., 600 Hz to 1100 Hz), high drive voltage (e.g., ≥1100 Vrms) for the sonar transducer load.

The input DC-DC converter circuit topology is more so to enable the multi-level output DC-AC inverter. The topology used is a variation of the commonly referenced phase shifted full bridge, however, various DC-DC converter circuit topologies could be used to generate the multi-level DC bus while still gaining the benefits of a low frequency amplifier that does not require a low frequency boost transformer (simultaneous high drive voltage, high power density, high efficiency, and wide bandwidth operation). The present input DC-DC converter is fed by a low voltage battery (e.g., <200 V) and consists of input and output capacitors, a Gallium Nitride (GaN) based full bridge inverter circuit, an isolation transformer, and two rectifying diodes. The full bridge semiconductors are controlled using duty cycle or phase shift modulation to regulate the multi-level DC bus voltage and power. The input DC-DC converter can achieve a high efficiency due to the zero voltage switching of the full bridge semiconductors, which significantly reduces the turn-on switching losses of the primary side switching. Furthermore, by utilizing GaN semiconductors for the full bridge, the switching losses can be even further reduced (compared to a Si semiconductor based full bridge). The input DC-DC converter can also achieve a small size due to its high frequency operation and small semiconductor sizes. The high frequency operation directly reduces the size of circuit passives including the input and output filters (capacitors, inductors, and chokes) and the isolation transformer.

BRIEF DESCRIPTION OF THE DRAWINGS

These and other features, aspects, and advantages of the present disclosure will become better understood with regard to the following description, appended claims, and accompanying drawings where:

DESCRIPTION

In the Summary above and the Description, and the claims below, and in the accompany drawings, reference is made to particular features (including method steps) of the disclosure. It is to be understood that the disclosure herein includes all possible combinations of such particular features. For example, where a particular aspect or implementation of the disclosure, or a particular claim, that feature can also be used, to the extent possible, in combination with and/or in the context of the other particular aspects and implementations of the disclosure, and in the disclosure generally.

At a high level, one implementation of the disclosure includes an input DC-DC converter (10) and an output DC-AC inverter (20). See FIGS. 1A and 1B. The input DC-DC converter (10), shown in FIG. 1A, boosts the low voltage from the input battery (30) and generates a high voltage multi-level DC bus (90). The output DC-AC inverter (20), shown in FIG. 1B, converts the high voltage from the multi-level DC bus to a high voltage AC drive voltage waveform and applies it to the load (130). Specifically, one implementation of the disclosure was created to drive an underwater sonar transducer load for a sonobuoy application.

Figure 1A:
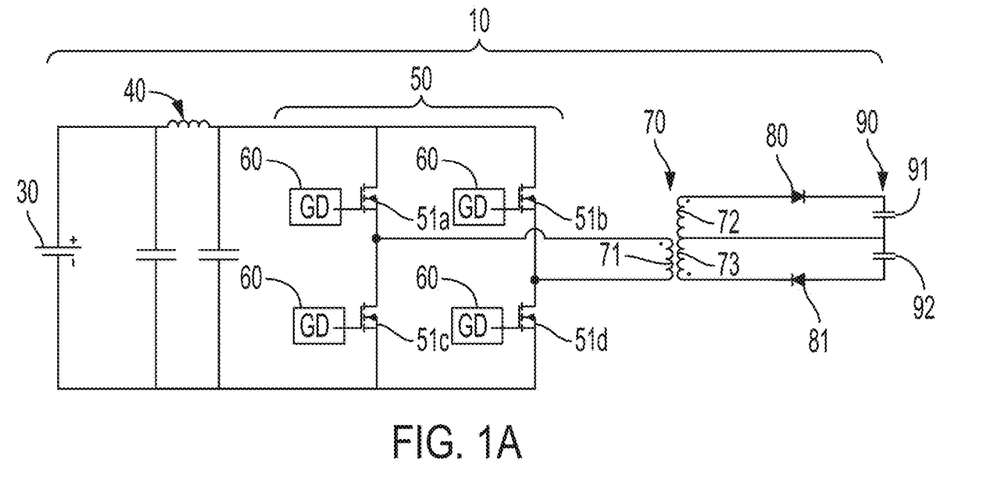
FIG. 1A shows a schematic of an implementation of the 2-level input DC-DC converter.

The input DC-DC converter's (10) topology is a variation of the well-known phase shifted full bridge converter. For this application, the two input leads from a <200 V input battery (30) (voltage referred to as $V_{bat}$) are fed through a capacitor-inductor-capacitor (CLC) type input filter (40). This input filter (40) attenuates the conducted electromagnetic interference (EMI) generated by the switching semiconductors of the H-bridge circuit (50), described more fully hereinbelow. Although a CLC input filter is used here, the disclosure is not limited to this type of filter. Other filter topologies consisting of various capacitors, inductors, and chokes can also provide sufficient EMI filtering and attenuation.

The output of the input filter (40) is connected to an H-bridge circuit (50). In this example implementation, the H-bridge circuit includes four Gallium Nitride (GaN) semiconductors (51a-51d) with voltage ratings of at least 200 V and current ratings of at least 90 A. While four semiconductors are shown, the disclosure is not limited to four: in other implementations, multiple semiconductors can be paralleled to manage higher currents, a different inverter topology could be used (e.g., a half bridge inverter topology), and/or multiple H-bridge circuits could be used. Each semiconductor (51a-51d) has a dedicated gate drive circuit (60) which converts a digital pulse width modulated (PWM) signal from the control circuit (140), discussed more fully hereinbelow, to an isolated gate drive signal.

Figure 2:
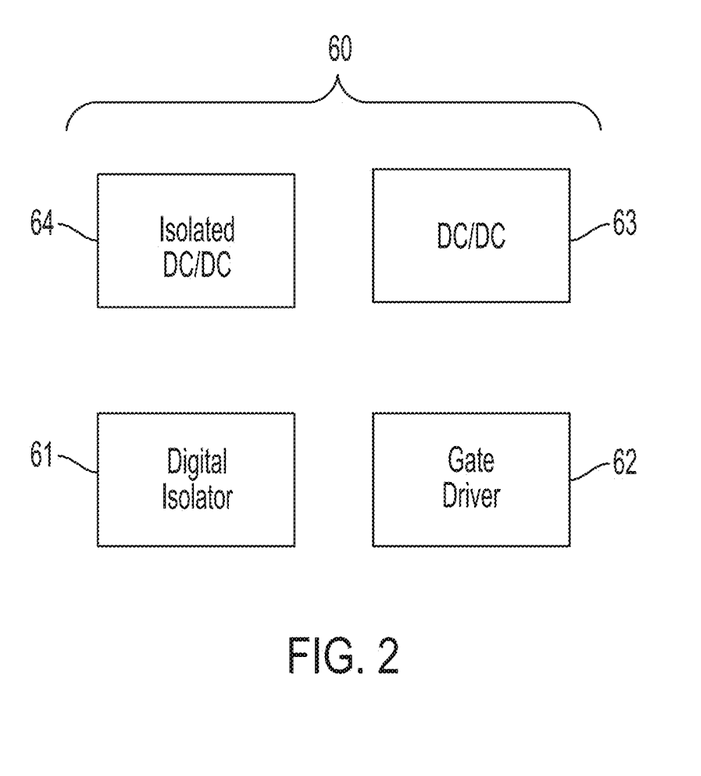
FIG. 2 shows a function block diagram of the gate drive circuit.

As shown in FIG. 2, the proposed gate drive circuit (60) has four major functions that are achieved using standard off-the-shelf integrated circuits (ICs) and printed circuit board (PCB) mount components. Each gate drive circuit (60) has a digital isolator (61) and gate driver (62). The digital isolator (61) is used to transfer the PWM from the control circuit's (140) ground to the isolated gate driver circuit's (60) ground. The digital isolator (61) uses a DC-DC converter (63) that references the control circuit's (140) ground and an isolated DC-DC converter (64) to reference the gate driver (60) circuit's ground. Since the respective power transistor's gate on and off voltages are regulated using the isolated dc-dc converter (64), the gate driver (62) takes the power from the isolated DC-DC converter (64) and the PWM signal from the digital isolator (61) to directly drive the power transistor's gate.

Figure 3:
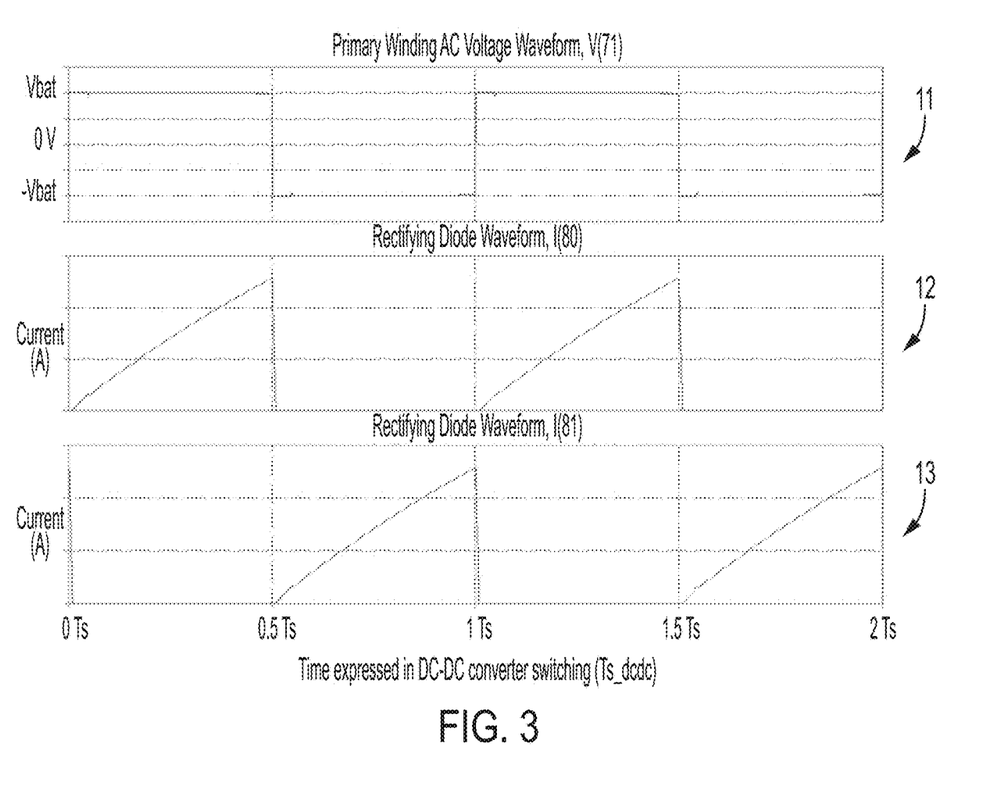
FIG. 3 shows operation waveforms from the input DC-DC converter, including the primary winding voltage waveform and the two rectifying diode current waveforms.

Returning to FIG. 1A, the H-bridge circuit (50) generates a primary winding AC voltage waveform (11), shown in FIG. 3, with an amplitude equal to $+V_{bat}$, 0 V, or $-V_{bat}$ and applies it to the primary winding (71) of an isolation transformer (70) with a primary to secondary turns ratio of 1:10 or greater, in some implementations. The isolation transformer (70) boosts the primary winding AC voltage waveform and transfers the boosted voltage to its two secondary windings (72, 73). Each of the two secondary windings connect to a rectifying diode (80, 81) with a voltage rating of at least 1700 V and a current rating of at least 5 A, in some implementations. During steady-state operation of at least one implementation, each of the two series stacked DC bus capacitors (91, 92) are charged to a voltage of at least 1 kV, forming a multi-level DC bus (90) with a voltage ($V_{bus}$) of at least 2 kV.

Although the DC-DC converter described herein utilizes two series stacked capacitors for its multi-level DC bus (90), the disclosure is not limited to two levels. FIG. 1C, for example, demonstrates an alternative n-level implementation of the input DC-DC converter which uses a transformer with additional secondary windings (74a-74n, 75a-75n) and rectifying diodes (82a-82n, 83a-83n). FIG. 1D shows a second alternative n-level implementation of the input DC-DC converter which uses multiple parallel transformers (76a-76n) operating off of a single full H-bridge (50), with a rectifying diode (82a-82n, 83a-83n) series connected to each transformer secondary winding. Another possible permutation to achieve an n-level design that is not shown would be to use multiple parallel transformers, each with their own dedicated full bridge circuit. For the input DC-DC converter stage (10), implementations having additional levels allows for the use of rectifying diodes (82a-82n, 83a-83n) and DC bus capacitors (93a-93n, 94a-94n) with reduced voltage ratings. Having additional levels also provides benefits to the output DC-AC inverter (20) which is described hereinbelow.

Turning to FIG. 1A and FIG. 3, duty cycle control is used to regulate the input DC-DC converter's output voltage ($V_{bus}$) and output power. It should however be appreciated that suitable regulating controls, such as phase shift control could be used. The two sets of GaN semiconductors (51a and 51d, 51b and 51c) are switched complementary to each other with fixed duty ratios between 0% and 50%. When GaN semiconductors (51a and 51d) are gated on, the primary winding voltage AC waveform (11) is in its positive half cycle, rectifying diode (80) conducts current as depicted in waveform (12), and capacitor (91) is charged. See FIG. 3 for waveforms (11) and (12). When GaN semiconductors (51b and 51c) are gated on, the primary winding voltage is in its negative half cycle, rectifying diode (81) conducts current, as depicted in waveform (13), and capacitor (92) is charged. See FIG. 3. To achieve a greater DC bus voltage or output power transfer, a larger duty cycle may be used. To achieve a lower DC bus voltage or output power transfer, a smaller duty cycle may be used.

Figure 1B:
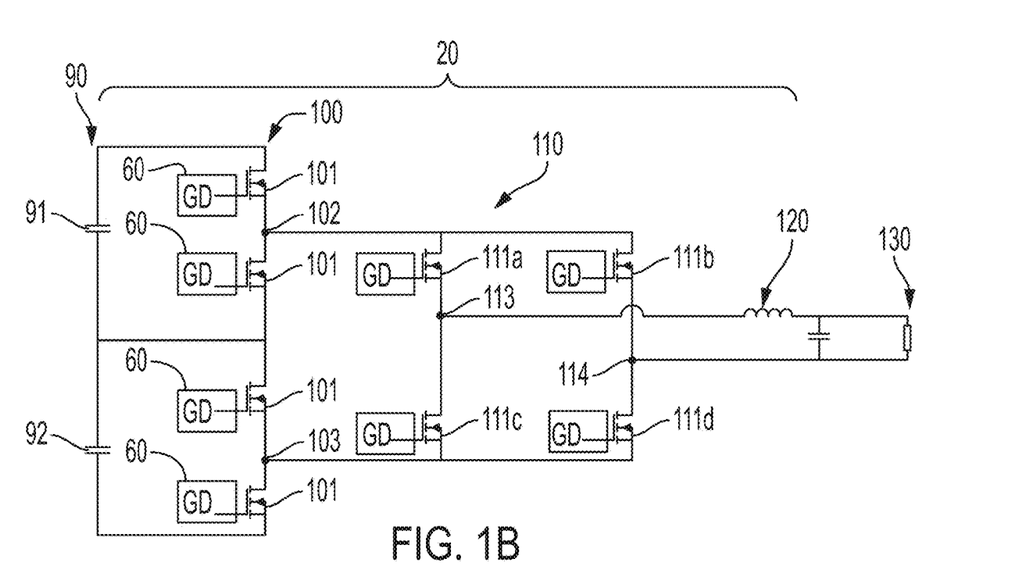
FIG. 1B shows a schematic of an implementation of the 2-level output DC-AC inverter.
Figure 1C:
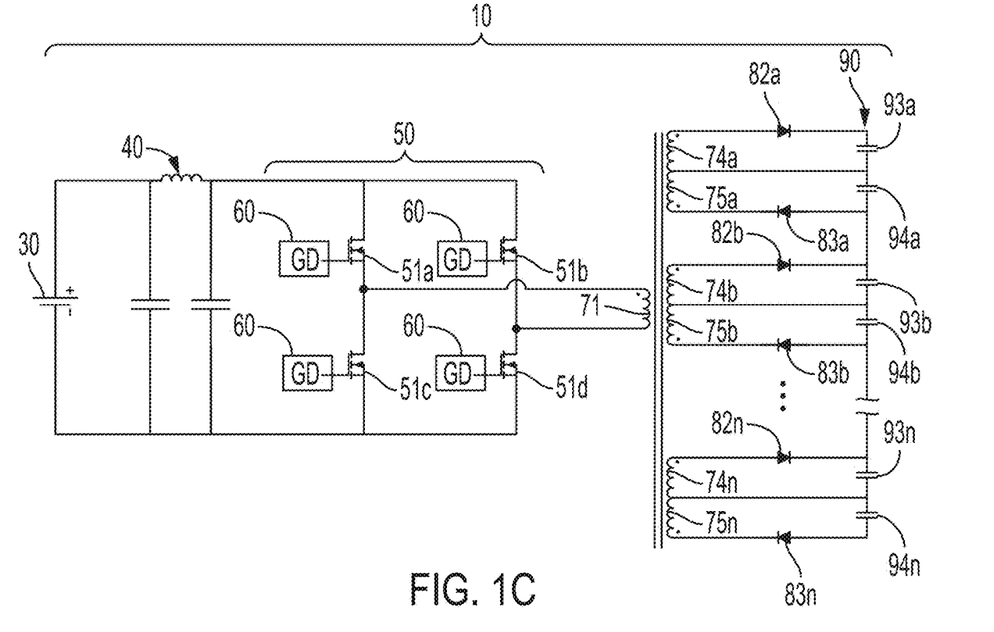
FIG. 1C shows a schematic of an alternative n-level implementation of the input DC-DC converter.
Figure 1D:
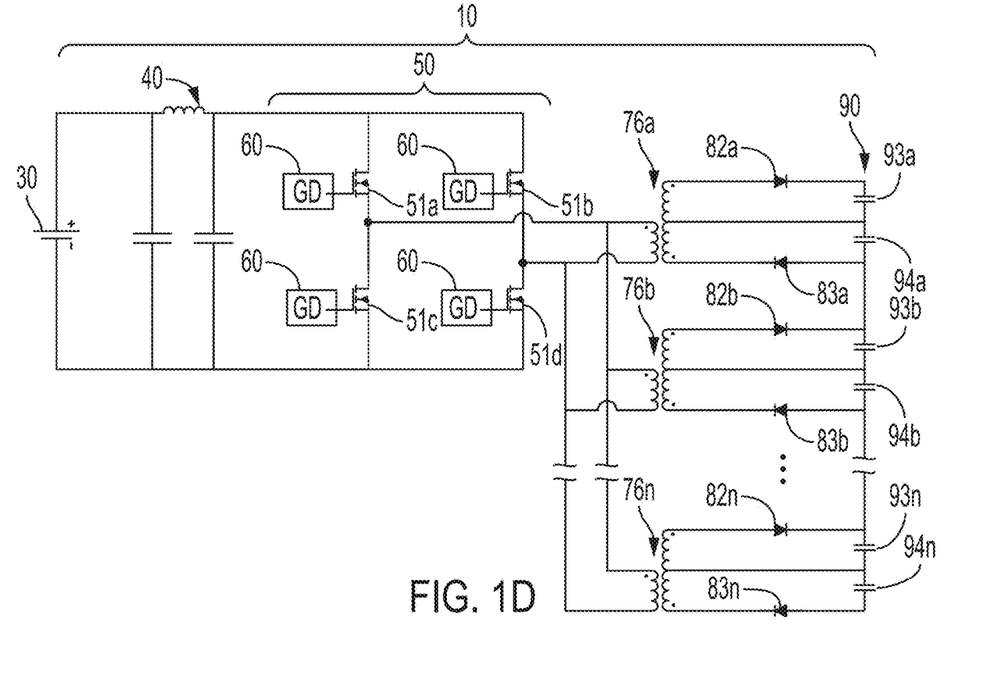
FIG. 1D shows a schematic of a second alternative n-level implementation of the input DC-DC converter.

As shown in FIG. 1B, one implementation of the output DC-AC inverter (20) is a multi-level modular topology including a multi-level DC bus (90), four high frequency silicon carbide (SiC) semiconductors (101), four silicon (Si) IGBTs (111a-111d), and an output EMI Filter (120). The multi-level DC bus (90) at the input of the output DC-AC inverter (20) illustrated in FIG. 1B is the same multi-level DC bus (90) as at the output of the input DC-DC converter (10) illustrated in FIG. 1A.

As shown in FIG. 1B, two series stacked half bridge circuits (100) are connected in parallel with each capacitor (91, 92) in the multi-level DC bus (90). Each of these half bridge circuits utilizes two SiC semiconductors (101) with voltage ratings of at least 1.7 kV and current ratings of at least 10 A. Each of these SiC semiconductors (101) has a dedicated gate drive circuit (60), described hereinabove. These four SiC semiconductors (101) are switched, in one implementation, at a switching frequency greater than five times the output load frequency to produce a 3-level unipolar voltage waveform (21), shown in FIG. 4, at nodes (102, 103) with values of $V_{bus}$, ½ $V_{bus}$, and 0 V.

Nodes (102, 103) are then connected to a full bridge (110) including, in some implementations, of four insulated gate bipolar transistors (IGBTs) (111a-111d) with ratings of at least 2.4 kV and 10 A. The full bridge IGBTs are switched at the zero amplitude crossing points of the desired output voltage waveform (23) to convert the 3-level unipolar voltage waveform (21) at nodes (102, 103) into a 5-level bipolar voltage waveform (22), shown in FIG. 4, at nodes (113, 114) with values stepping between $-V_{bus}$, $-½ V_{bus}$, 0 V, ½ $V_{bus}$, $V_{bus}$. Specifically, IGBTs (111a and 111d) are switched on to create a positive output voltage and IGBTs (111b and 111c) are switched on to create a negative output voltage.

Figure 4:
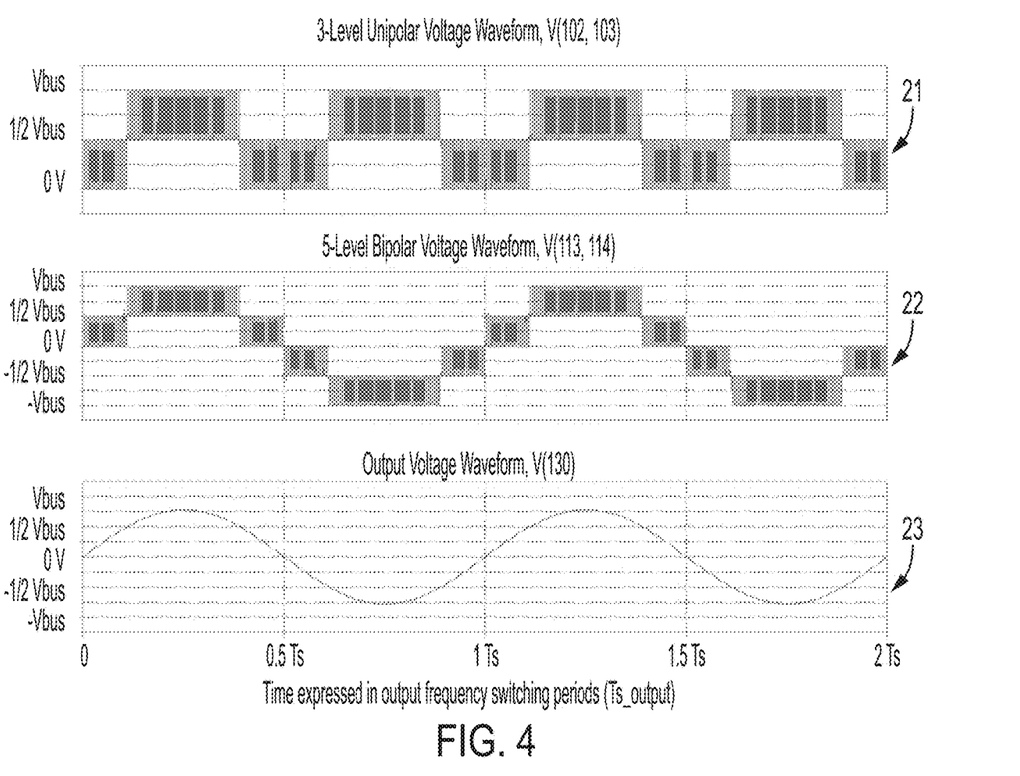
FIG. 4 shows operation waveforms from the output DC-AC inverter, including the 3-level unipolar voltage waveform, 5-level bipolar voltage waveform, and load voltage.

Finally, the 5-level bipolar voltage waveform (22) at nodes (113, 114) is fed through an inductor-capacitor (LC) type output EMI filter (120) to attenuate the switching frequency EMI content and provide a low total harmonic distortion (THD) output voltage waveform (23), shown in FIG. 4, to the load (130). The design is not constrained to an LC type EMI filter. In some implementations, other suitable filter topologies consisting of various capacitors, inductors, and chokes could also provide sufficient EMI filtering.

Figure 1E:
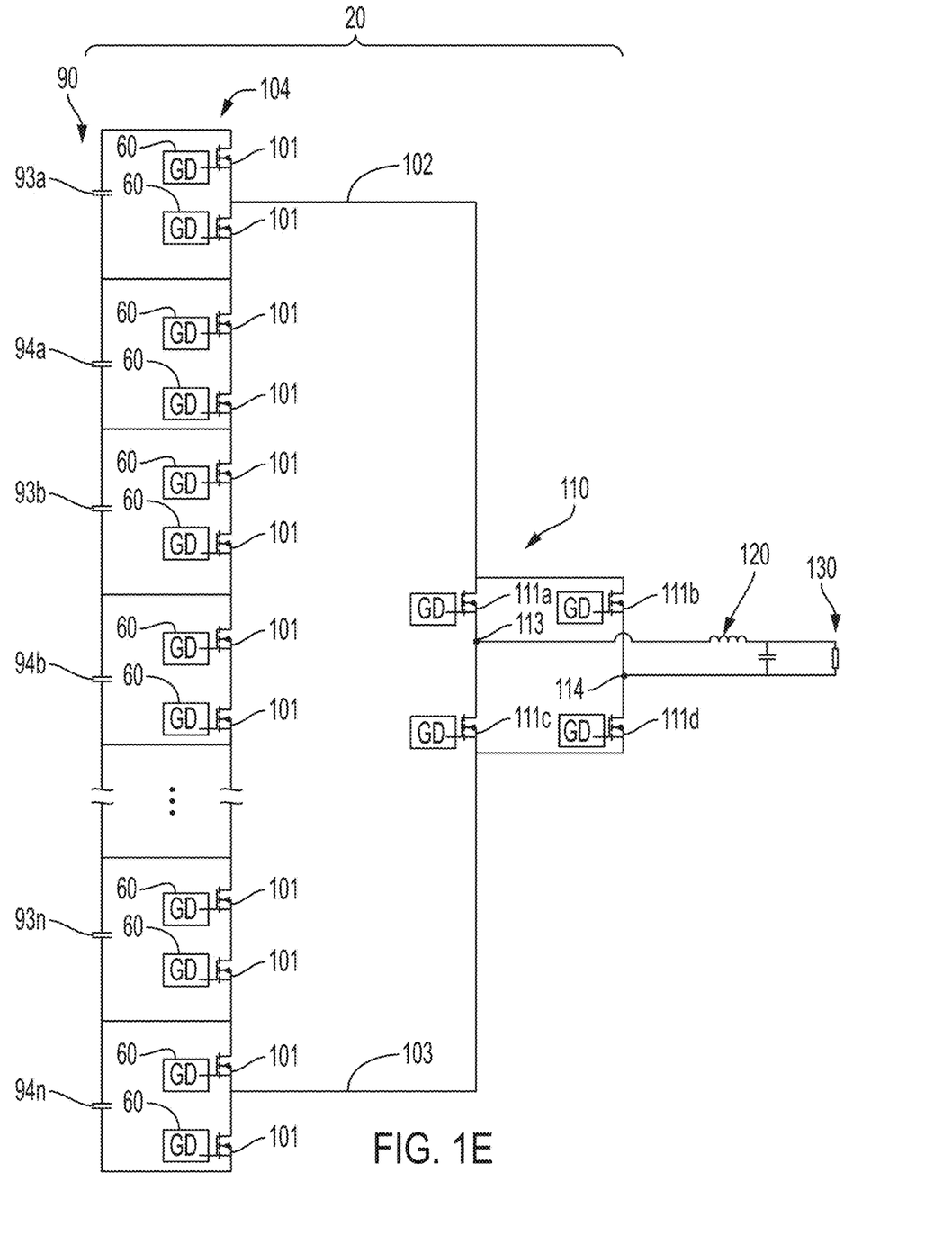
FIG. 1E shows a schematic of an alternative n-level implementation of the output DC-AC inverter.

Although the DC-AC inverter design described herein is demonstrated with two series stacked capacitors for the multi-level dc bus (90), the disclosure is not limited to two levels. As shown in FIG. 1E, an alternative n-level implementation of the inverter topology can be realized by series stacking additional DC bus capacitors (93a-93n, 94a-94n) and placing additional series stacked half bridge circuits (104) in parallel with each series stacked capacitor. These additional levels provide the benefit of lower voltage stresses on the DC bus capacitors and SiC semiconductors (101). Additional levels will also decrease the voltage step amplitudes in the 5-level bipolar voltage waveform (22), allowing for a smaller output EMI filter (120) or reduced conducted EMI noise.

Figure 5:
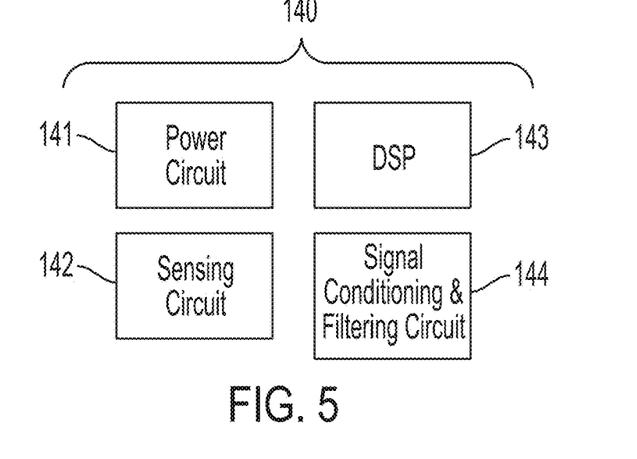
FIG. 5 shows a block diagram of the control circuit.

The input DC-DC converter (10) and output DC-AC inverter (20) are controlled through their gate drive circuits (60) using a control circuit (140). As shown in FIG. 5, the control circuit (140) has four major functions that are implemented using standard off-the-shelf ICs and PCB mount components. In one implementation, the control circuit (140) has a power circuit (141) to step down the battery voltage and generate the voltages necessary to power the rest of the control circuitry. The control circuit also has a sensing circuit (142) including voltage, current, and temperature sensors. These sensors monitor the input battery (30) voltage ($V_{bat}$), input battery current ($I_{bat}$), multi-level DC bus (90) voltage ($V_{bus}$), load (130) voltage ($V_{load}$), and load current ($I_{load}$). The closed loop control is implemented using a digital signal processor (DSP) (143). In one implementation, DSP (143) takes the analog signals from the voltage and current sensors, processes the measurements through separate input DC-DC stage closed loop controls (150), see FIG. 6, and output DC-AC stage closed loop controls (160), see FIG. 7, and outputs corresponding PWM signals to the respective gate drive circuits (60) to regulate the power circuitry. Finally, the control circuit has a signal conditioning and filtering circuit (144) to filter out unwanted noise from the analog measurement signals and the output PWM signals. Although the control of the power stage was implemented as described, the power stage can be controlled with different suitable control circuitry and achieve the same performance. One such example implementation would be control circuitry that does not use a DSP but uses analog feedback controls instead.

Figure 6:
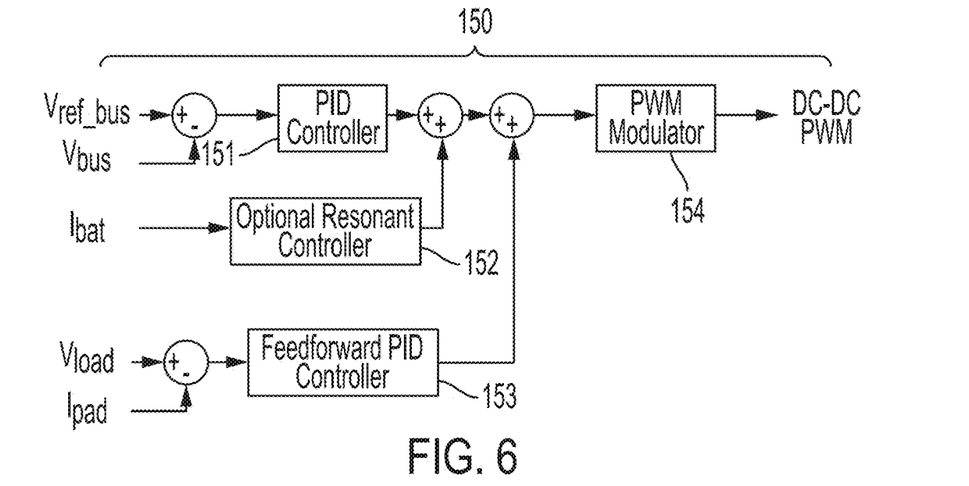
FIG. 6 shows a block diagram of the input DC-DC converter closed loop controls.

As shown in FIG. 6, the input DC-DC stage closed loop controls (150) include both a feedback controller and a feedforward controller. In one implementation, a proportional-integral-derivative feedback (PID) controller (151)

will regulate the multi-level DC bus (90) voltage ($V_{bus}$) to its setpoint ($V_{ref\_bus}$). A feedforward PID controller (153) will algebraically modify the duty cycle as a function of the load output power. This allows for a much faster response to load transients than would be possible with solely feedback control. In some implementations, in order to reduce conducted emissions, the DC-DC converter may also have a feedback resonant controller (152) to eliminate or reduce the input battery current ripple at twice the load output frequency for sinusoidal output operation. Finally, these controller outputs are summed together and fed through a PWM modulator (154) which converts the scalar output of the controllers into useable PWM signals for the input DC-DC converter.

Figure 7:
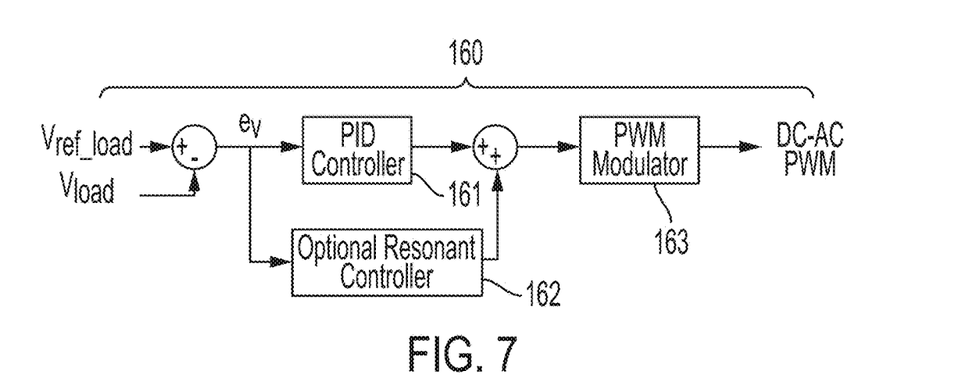
FIG. 7 shows a block diagram of the output DC-AC inverter closed loop controls.

As shown in FIG. 7, the DC-AC inverter closed loop controls (160) include a feedback PID controller (161) to regulate the load output voltage ($V_{load}$) to its reference voltage ($V_{ref\_load}$) at the reference frequency. Optionally, the inverter controller will also have feedback resonant controller (162) to eliminate unwanted harmonics from the output voltage waveform. Finally, these controller outputs are summed together and fed through a PWM modulator (163) which converts the scalar output of the controllers into useable PWM signals for the output DC-AC inverter.

Although the proposed input DC-DC converter closed loop control and output DC-AC inverter closed loop controls adequately control the described circuits, these are not the only way to successfully control these power stages. In other implementations, effective closed loop controls can be implemented differently than the proposed design using varied suitable arrangements of control elements such as feedback, feedforward, filters, and sensors.

The described implementations of the present disclosure were designed to operate as an amplifier for a next generation low frequency (e.g., 600 Hz to 1100 Hz) sonobuoy to drive a sonar transducer. When operated as intended, an external signal (analog or digital) will be received by the amplifier which defines the desired load voltage and waveform type. This input signal is translated using the control circuit (140) into useable PWM signals that are sent to their respective gate drive circuits (60) to control the amplifier power circuit (10, 20).

The described implementations of the present disclosure have the ability to simultaneously achieve a high output drive voltage (e.g., ≥1100 Vrms), and wide output bandwidth (e.g., 600 Hz to 1100 Hz) with the advantage of a higher efficiency (e.g., ≥85%) and power density/small size (e.g., ≤35 in$^3$) than current existing low frequency sonobuoy amplifier designs. Existing designs utilize a single stage low voltage inverter (such as an H-bridge circuit) followed by a boost transformer to achieve the high output drive voltage. Such design approaches are particularly unfavorable for low frequency sonobuoys since the boost transformer must become large and/or inefficient to avoid saturation at the low operation frequencies. This ultimately limits the ability to achieve both a high power density and efficiency which are both critical to the sonobuoy application. A higher efficiency directly means the sonobuoy can operate for longer periods of time before it runs out battery power, and a higher power density means there is more available space for either additional circuitry (to aid in various functions) or battery cells (to increase operation time).

Alternatively, the implementations of the present disclosure avoid this design bottleneck with a two stage design that does not include a low frequency transformer. The input DC-DC converter can achieve a small size because of its small sized parts (input EMI filter, semiconductors, diodes, capacitors, gate drive circuitry) and reduced transformer size (due to high frequency operation) and can achieve high efficiency due to its soft switching capability and use of highly efficient GaN semiconductors. The output DC-AC inverter can achieve a high power density because of the small sized parts (semiconductors, gate drive circuitry, output filter) and can achieve a high efficiency due to its use of SiC semiconductors, which have significantly reduced switching losses and reverse recovery losses compared to high voltage Si semiconductors.

The key feature of the disclosure that enables both a higher power density and efficiency compared to existing designs is the combination of the two stage design, multi-level DC-AC inverter topology, and use of 1700 V rated SiC semiconductors. Before the commercial availability of 1700 V rated SiC semiconductors, two stage designs could not achieve a high efficiency and power density because ≥1700 V rated Si devices have very large reverse recovery losses. The multi-level topology is what enables the use of 1.7 kV rated SiC semiconductors with a 2 kV DC bus since the devices will only see half of the DC bus voltage with a 2-level design. A non-multi-level inverter topology such as a H-bridge or half bridge circuit could not use SiC with a 2 kV DC bus because it would require >2 kV rated SiC semiconductors which are not currently commercially available for the power levels desired.

While we have shown and described several implementations in accordance with our disclosure, it should be understood that the same is susceptible to further changes and modifications without departing from the scope of our disclosure. Therefore, we do not want to be limited to the details shown and described herein but intend to cover all such changes and modifications as are encompassed by the scope of the appended claims.

What is claimed is:

1. An inverter for delivering power with a desired output voltage waveform with an output frequency content between 600 Hz to 1100 Hz to a load, the inverter comprising:
    a plurality of series stacked half-bridge circuits, each in parallel with capacitors, configured to convert a greater than 2 kV DC voltage into a modulated unipolar voltage waveform, wherein each half-bridge circuit operates independently at a switching frequency that is greater than five times the inverter's output frequency;
    a full bridge circuit is connected to the plurality of series stacked half-bridge circuits and the full bridge circuit is configured to convert the unipolar voltage waveform into a modulated bipolar voltage waveform having a positive amplitude and a negative amplitude, wherein the full bridge circuit switches at zero amplitude crossing points of the modulated bipolar voltage waveform to achieve the modulated bipolar voltage waveform; and
    an output filter is connected the full bridge circuit and is connected to the load, wherein the output filter converts the modulated bipolar voltage waveform into the desired output voltage waveform with frequency content between 600 Hz and 1100 Hz.

2. The inverter of claim 1, wherein the plurality of series stacked half-bridge circuits are two series stacked half-bridge circuits comprising a plurality of 1.7 kV rated SiC semiconductors.

3. The inverter of claim 2, wherein the plurality of 1.7 kV rated SiC semiconductors in each series stacked half-bridge circuit consists of two 1.7 kV rated SiC semiconductors.

4. The inverter of claim 1, wherein the full bridge circuit consists of a plurality semiconductors with voltage ratings greater than 2 kV.

5. The inverter of claim 4, wherein the plurality of semiconductors consists of four IGBTs with voltage ratings of 2.4 kV.

\* \* \* \* \*